US005258674A

United States Patent [19]

Sakamoto et al.

[11] Patent Number: 5,258,674

[45] Date of Patent: Nov. 2, 1993

[54] STARTER MOTOR WITH AN INTERMEDIATE GEAR WHEEL

[75] Inventors: Toshio Sakamoto, Ako; Shuzou Isozumi, Himeji, both of Japan

[73] Assignee: Mitsubishi Denki K.K., Tokyo, Japan

[21] Appl. No.: 942,413

[22] Filed: Sep. 9, 1992

[30] Foreign Application Priority Data

Sep. 10, 1991 [JP] Japan ........ 3-259778

[51] Int. Cl.[5] ........ H02K 7/06; H02K 7/10; F02N 15/06

[52] U.S. Cl. ........ 310/83; 74/7 A; 74/7 C; 310/92

[58] Field of Search ........ 310/83, 92, 100, 99, 310/7 JR; 74/205, 322, 345, 343, 340, 417, 7 A, 7 C

[56] References Cited

U.S. PATENT DOCUMENTS

| | | | |
|---|---|---|---|
| 4,868,407 | 9/1989 | Isozumi | 74/7 A |
| 4,929,857 | 5/1990 | Isozumi | 310/83 |
| 4,931,680 | 6/1990 | Sugiyama | 310/83 |
| 4,974,463 | 12/1990 | Luiki . | |
| 5,016,484 | 5/1991 | Morikane | 74/7 A |
| 5,130,586 | 7/1992 | Miyaji et al. | 310/83 |
| 5,165,293 | 11/1992 | Kittaka et al. | 74/7 A |

*Primary Examiner*—Steven L. Stephan
*Assistant Examiner*—Ed To
*Attorney, Agent, or Firm*—Sughrue, Mion, Zinn, Macpeak & Seas

[57] ABSTRACT

A starter motor with an intermediate gear wheel. The starter motor includes an interposition member interposed between the front end of a clutch cover fitted onto an overrunning clutch and the rear end of an intermediate gear wheel, a movable connecting member including a boss portion which is loosely fitted onto the outer circumference of an extended boss portion projecting backwardly from the rear end portion of the intermediate gear wheel, and a circular-arc-shaped fitting portion which is formed integrally with the rear end portion of the boss portion to extend upwardly and which is fitted to a lower half portion of a fitting groove formed at the rear end portion of the overrunning clutch so as to be movable in the axial direction of the clutch.

5 Claims, 4 Drawing Sheets

STARTER MOTOR WITH AN INTERMEDIATE GEAR WHEEL

BACKGROUND OF THE INVENTION

1. Field of the Invention

The present invention relates to a starter motor with an intermediate gear wheel used for a vehicle. More particularly, it relates to a moving means to cause the movement of the intermediate gear wheel when an overrunning clutch is moved.

2. Discussion of Background

FIG. 6 is a longitudinal cross-sectional view partly broken of a conventional starter motor with an intermediate gear wheel. In FIG. 6, reference numeral 1 designates a d.c. motor in which a rotary shaft 3 projects forwardly (to the right side in drawing) from an armature 2. Numeral 4 designates the yoke of the d.c. motor, on which field magnetic poles 5 are mounted. Numeral 6 designates a front bracket attached to the yoke 4, which supports the front end portion of the rotary shaft 3 by means of a sleeve bearing 7.

Numeral 9 designates an overrunning clutch mounted on the rotary shaft 3 so as to be slidable in the axial direction. The overrunning clutch 9 is constructed as follows. A clutch outer 10 is fitted to the outer circumference of the rotary shaft by means of a helical spline 8 so as to transmit a torque of the rotary shaft 3. A clutch inner 11 is supported by the rotary shaft 3 through a sleeve bearing 19 so that a one-way revolutional force is transmitted to the clutch outer 10 through a roller 12. A pinion 13 is formed integrally with the front end portion of the clutch inner 11. Numeral 14 designates a clutch cover fixed to the clutch outer 10 together with a plate 15 by means of caulking. Numeral 16 designates a stop ring attached to the clutch outer 10 to form a fitting groove between a step portion formed in the clutch outer and the stop ring. Numeral 18 designates an eccentricity control ring firmly attached to the inner circumferential portion of the clutch outer 10.

Numeral 20 designates a shift lever having a pivotal point which is supported by the inner wall of the front bracket 6 and a bearing plate 21, the lower end portion extending downwardly from the pivotal point being engaged with the fitting groove 17 to move the overrunning clutch 9 in the axial direction. The upper end portion of the shift lever 20 is engaged with the front end of the plunger (not shown) of an electromagnetic switch which is located at the upper portion of the motor. The shift lever is turnable around the pivotal point. The bearing plate 21 is received on a grommet 22 attached to the yoke 4 through a shock absorbing spring 23. Numeral 29 designates a stopper fixed to the rotary shaft 3.

Numeral 24 designates an intermediate shaft fixed to the front bracket 6 in parallel to the rotary shaft 3, numeral 25 designates a grommet fitted to a hole formed in the front bracket 6 to receive the intermediate shaft 24, and numeral 26 designates an intermediate gear wheel mounted on the intermediate shaft 24 through a sleeve bearing 28 fixed to the inner circumferential portion of the intermediate gear wheel 26 so as to be rotatable and slidable in the axial direction. Numeral 30 designates a movable connecting member made of a strengthened synthetic resin or metal having a resistance to bearing and a large mechanical strength. The movable connecting member comprises a boss portion 30*a* which is loosely fitted to the outer circumference of an extended boss portion 26*a* projecting from the intermediate gear wheel 26. A snap ring 31 is provided on the extended boss portion 26*a* of the intermediate gear wheel to prevent the movable connecting member 30 from coming-off. A circular-arc-shaped fitting portion 30*b* is formed integrally with the upper portion of the rear end of the boss portion 30*a* and the fitting portion 30*b* is inserted in the lower half portion of the fitting groove 17 of the overrunning clutch so as to move together in the axial direction.

FIG. 7 is a perspective view showing the movable connecting member 30 comprising the boss portion 30*a* and the circular-arc-shaped fitting portion 30*b* formed integrally with the lower end of the boss portion 30*a*.

The operation of the conventional starter motor will be described.

When a current is supplied to an exciting coil (not shown) of the electromagnetic switch, the plunger is attracted to turn the shift lever 20 in a counter-clockwise direction in FIG. 6. Accordingly, the overrunning clutch 9 is moved forwardly (in the direction of A) until the overrunning clutch 9 hits the stopper 29 attached to the rotary shaft 3. When the overrunning clutch 10 is moved forwardly, the intermediate gear wheel 26 is also moved forwardly through the movable connecting member 30 to be interlocked with the ring gear 35 of the internal combustion engine of the vehicle. Then, a fixed contact of the electromagnetic switch is closed to feed a current in the circuit of the d.c. motor to thereby activate the armature 2. The revolution of the rotary shaft 3 is transmitted to the intermediate gear wheel 26, hence the ring gear 35 via the overrunning clutch 9 and the pinion 13, whereby the internal combustion engine is started.

In the conventional starter motor with an intermediate gear wheel, when the intermediate gear wheel 26 is moved in association with the overrunning clutch 9, a force is applied to the stop ring 16. When the interlocking of the intermediate gear wheel 26 with the ring gear 35 is performed in a normal state, a force to be applied to the stop ring 16 is small. However, in an abnormal operation such that during idling revolution of the intermediate gear wheel 26, it is brought into interlocking with the ring gear 35 by inserting the key switch of the automobile, a large moving force is resulted in the direction of A in the overrunning clutch 9 because of the helical spline 8 although the movement of the intermediate gear wheel 26 is stopped when the gear wheel is brought to contact with the end surface of ring gear 35, and the circular-arc-fitting portion 30*b* of the movable connecting member 30 fitted to the intermediate gear wheel 26 impinges the stop ring 16. The impingement may causes the deformation or breakage of the stop ring 16.

SUMMARY OF THE INVENTION

It is an object of the present invention to provide a starter motor with an intermediate gear wheel eliminating a danger of deformation or breakage of the stop ring even when the intermediate gear wheel is moved in association with the overrunning clutch.

The foregoing and other objects of the present invention have been attained by providing a starter motor with an intermediate gear wheel which comprises a d.c. motor; an overrunning clutch adapted to transmit a one-way revolution by the revolution of the rotary shaft of the motor, and adapted to be advanced or retracted by the turning of a shift lever; an intermediate shaft arranged in parallel to the axial center line of the overrunning clutch; an intermediate gear wheel which is supported by the intermediate shaft in a rotatable manner and an axially shiftable manner, and is interlocked with a pinion formed at the front end of the overrunning clutch, and which is movable forwardly so as to be interlocked with the ring gear of an engine whereby the engine is started to rotate; a movable connecting member comprising a boss portion which is loosely fitted onto the outer circumference of an extended boss portion projecting backwardly from the rear end portion of the intermediate gear wheel, but is prevented from moving in the axial direction, and a circular-arc-shaped fitting portion which is formed integrally with the rear end portion of the boss portion to extend upwardly and which is fitted to a lower half portion of a fitting groove formed at the rear end portion of the overrunning clutch so as to be movable in the axial direction of the clutch; and a stop ring provided at the rear end of the fitting groove, wherein an interposition member is interposed between the front end of a clutch cover fitted onto the overrunning clutch and the rear end of the intermediate gear wheel so that gaps are formed at the front and rear ends of the circular-arc-shaped fitting portion in the fitting groove in its axial direction.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
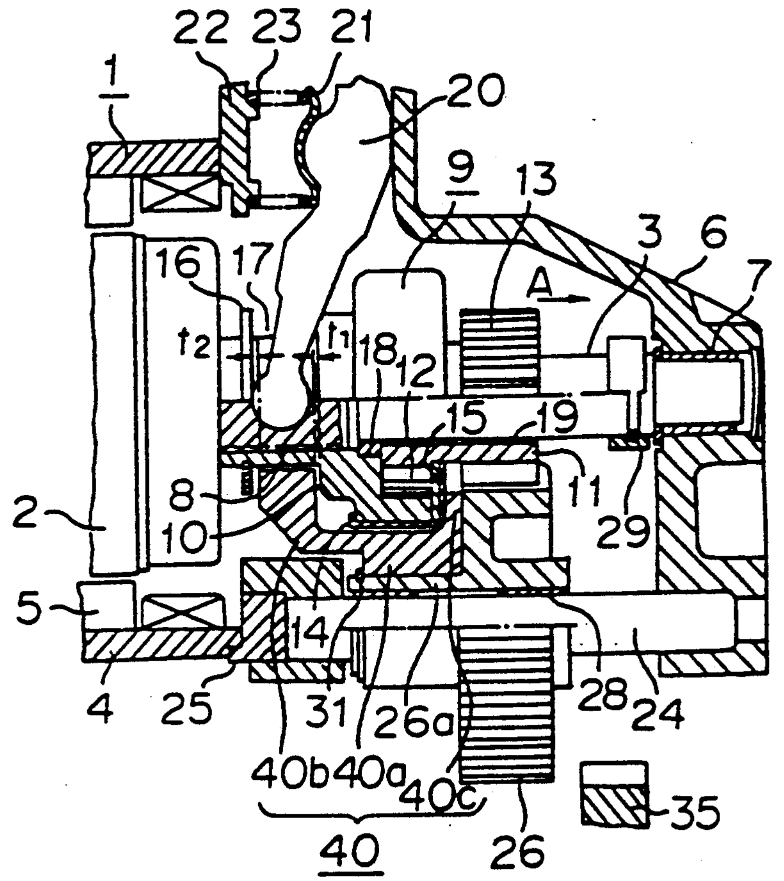
FIG. 1 is a longitudinal cross-sectional view partly broken of an embodiment of the starter motor with an intermediate gear wheel according to the present invention.

Referring to the drawings wherein the same reference numerals designate the same or corresponding parts throughout the several views, and more particularly to FIG. 1 thereof, there is shown a first embodiment of the starter motor with an intermediate gear wheel of the present invention.

Figure 2:
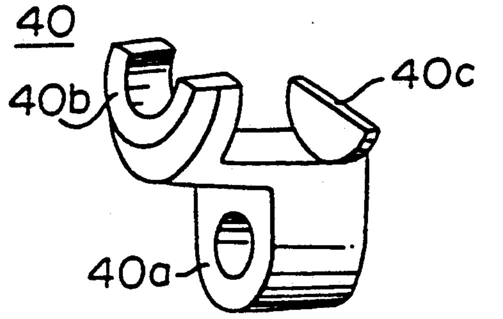
FIG. 2 is a perspective view of an embodiment of a movable connecting member used for the starter motor shown in FIG. 1.
Figure 6:
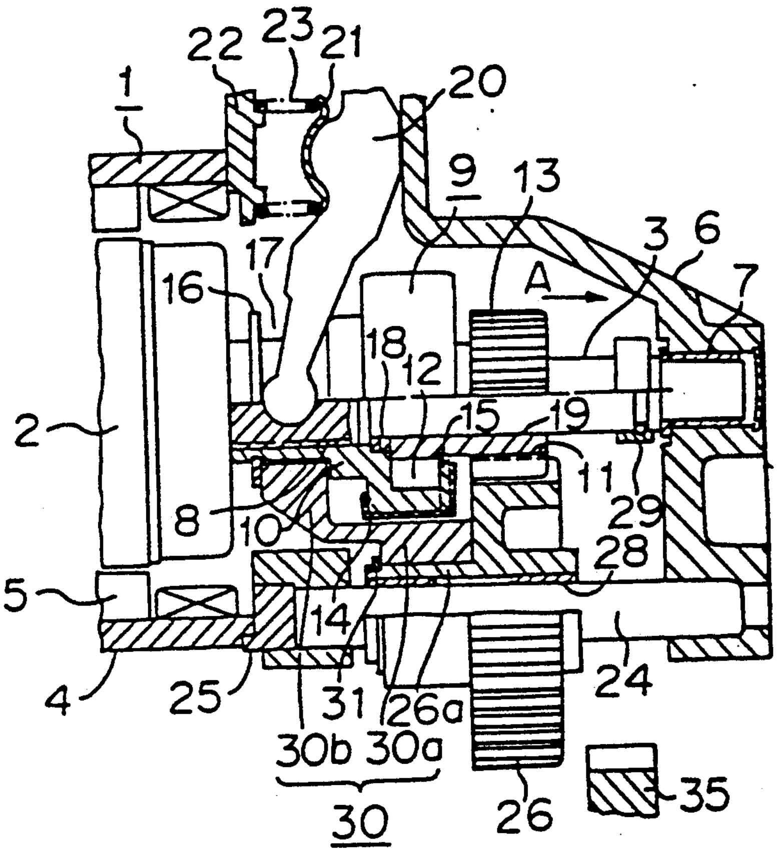
FIGURE 6 PRIOR ART
FIG. 6 is a longitudinal cross-sectional view partly omitted of a conventional starter motor with an intermediate gear wheel.
Figure 7:
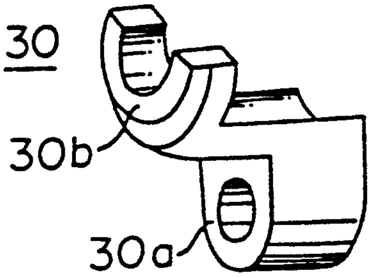
FIGURE 7 PRIOR ART
FIG. 7 is a perspective view showing a movable connecting member used for the conventional starter motor.

In FIG. 1, reference numerals 1 through 26, 28, 29, 31, 35 and 26*a* designate the same elements as in FIG. 6. Numeral 40 designates a movable connecting member made of a strengthened synthetic resin or metal having a resistance to wearing and a large mechanical strength. The movable connecting member 40 comprises, as shown in FIG. 2, a boss portion 40*a*, a circular-arc-shaped fitting potion 40*c* extending upwardly from the rear end part of the boss portion 40*a* and an interposing member 40*c* extending upwardly from the front end of the boss portion 40*a* wherein they are formed integrally. As shown in FIG. 1, the movable connecting member 40 has the boss portion 40*a* loosely fitted onto the outer circumference of the extended boss portion 26*a* of the intermediate gear wheel 26. A snap ring 31 is fitted on the extended boss portion 26*a* to thereby prevent the movable connecting member 40 from coming-off. The interposing member 40*c* is interposed between the front end of the clutch cover 14 which is attached to the overrunning clutch 9 and the rear end of the intermediate gear wheel 26. The improved structure of the movable connecting member 40 provides a gap $t_1$ between the front end of the circular-arc-shaped fitting portion 40*b* and a stepped portion formed at the front portion in the fitting groove 17, and a gap $t_2$ between the rear end of the circular-arc-shaped fitting portion 40*b* and the stop ring 16.

When the electromagnetic switch is actuated to start the automobile engine, the shift lever 10 is turned around the pivotal point to thereby cause the forward movement of the overrunning clutch 9. The forward movement of the overrunning clutch 9 also moves forwardly the intermediate gear wheel 26 through the interposing member 40*c* whereby the gear wheel 26 is brought to interlocked with the ring gear 35. During the forward movement of the overrunning clutch, the gaps $t_1$ and $t_2$ are maintained at the front and rear ends of the circular-arc-shaped fitting portion 40*b* in the fitting groove 17.

When the overrunning clutch 9 in an advanced position is moved backwardly by the turning operation of the shift lever 20 toward a retracted position, the front end of the circular-arc-shaped fitting portion 40*b* is pushed backwardly by the stepped portion formed at the front part of the fitting groove 17, whereby the intermediate warm gear 26 is moved backwardly through the movable connecting member 40. During the idling of the pinion 13, when the key switch is erroneously operated, the intermediate worm gear 26 is moved to hit the end surface of the ring gear 35 by which the movement of the intermediate gear wheel 26 is stopped. In this case, however, the presence of the interposing member 40*c* maintains the gap $t_2$ between the rear end of the circular-arc-shaped fitting portion 40*b* and the stop ring 16. Accordingly, there is no danger of the application of a large force to the stop ring 16, whereby deformation or breakage of the stop ring is prevented.

Figure 3:
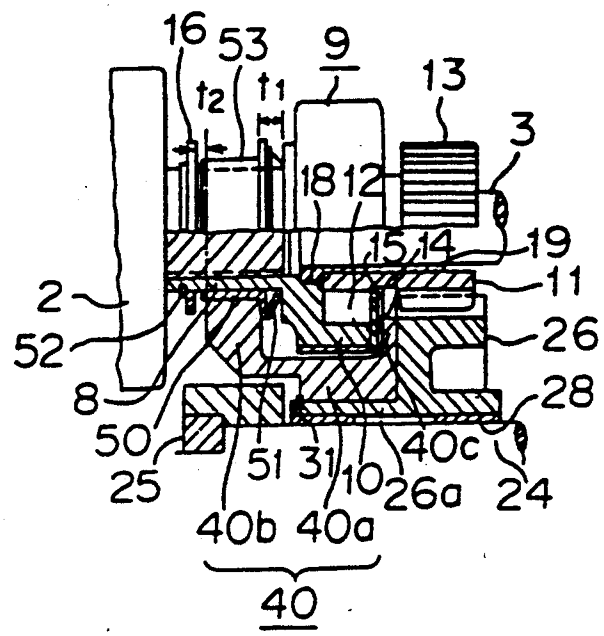
FIG. 3 is a longitudinal cross-sectional view partly omitted of a second embodiment of the starter motor with an intermediate gear wheel according to the resent invention.

FIG. 3 shows a second embodiment of the starter motor with an intermediate gear wheel according to the present invention.

In accordance with the second embodiment, a shock absorbing means is inserted in the gap $t_1$ between the front end of the circular-arc-shaped fitting portion 40*b* and the stepped portion formed at the front portion of the fitting groove 17. Namely, a cylindrical member 50 with a flange is fitted to the fitting groove 17 of the overrunning clutch 9 so that the flange faces the step portion of the fitting groove 17, and a conical spring washer 51 is inserted between the flange and the step portion to thereby urge the cylinder 50 in the axial direction. A snap ring 52 is provided adjacent to the stop ring 16. Numeral 53 designates a second fitting grooved formed between the cylinder 50 with a flange and the stop ring 16. The circular-arc-shaped fitting portion 40*b* is fitted to the lower half portion of the second fitting groove. In this case, the gap $t_2$ is formed between the rear end of the circular-arc-shaped fitting portion 40*b* and the stop ring 16.

Figure 4:
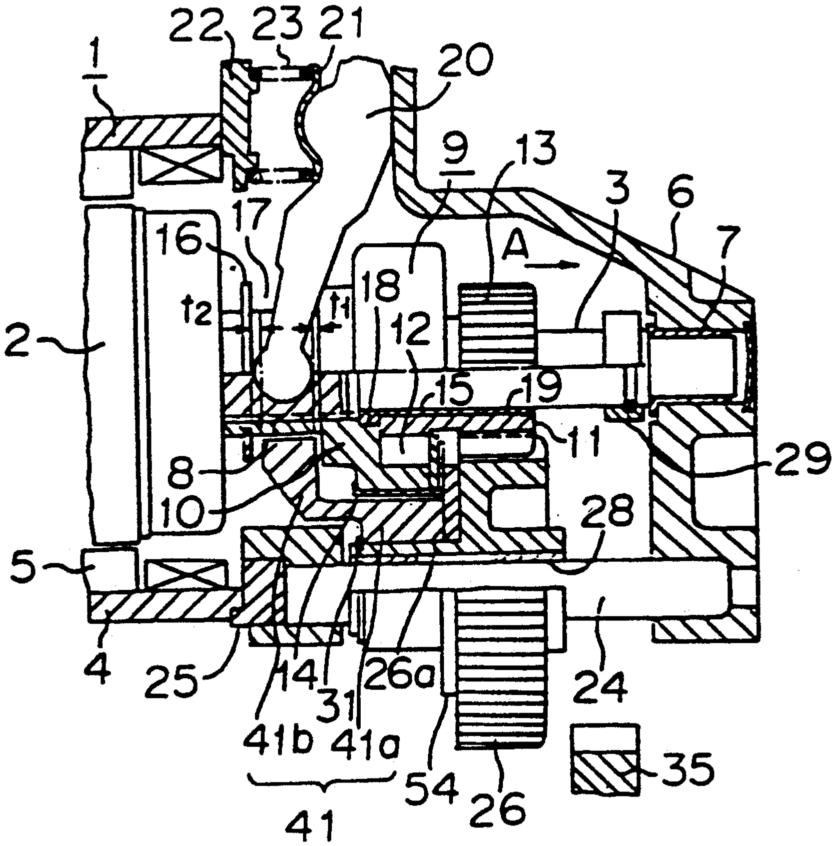
FIG. 4 is a longitudinal cross-sectional view partly omitted of the third embodiment of the starter motor according to the present invention.

FIG. 4 shows a third embodiment of the present invention.

An interposing member 54 is inserted between the front end of the clutch cover 14 attached to the overrunning clutch 9 and the rear end of the intermediate gear wheel 16. The interposing member 54 has a circular plate-like shape having a center opening and is fitted to the extended boss portion 26*a*. The interposing member 54 is made of a strengthened synthetic resin or metal having resistance to bearing and a large mechanical strength. Numeral 41 designates a movable connecting member having a boss portion 41*a* which is loosely fitted onto the outer circumference of the extended boss portion 26*a* of the intermediate gear wheel 26. The movable connecting member 41 is prevented from moving in the axial direction by means of a snap ring 31 and the interposing member 54. A circular-arc-shaped fitting portion 41*b* extending upwardly from the rear end of the boss portion 41*a* is fitted to the lower half portion of the fitting groove 17 so that a gap $t_1$ is formed between the front end of the fitting portion and the step portion formed at the front part of the fitting groove and a gap $t_2$ between the rear end of the fitting portion and the stop ring 16.

Figure 5A:
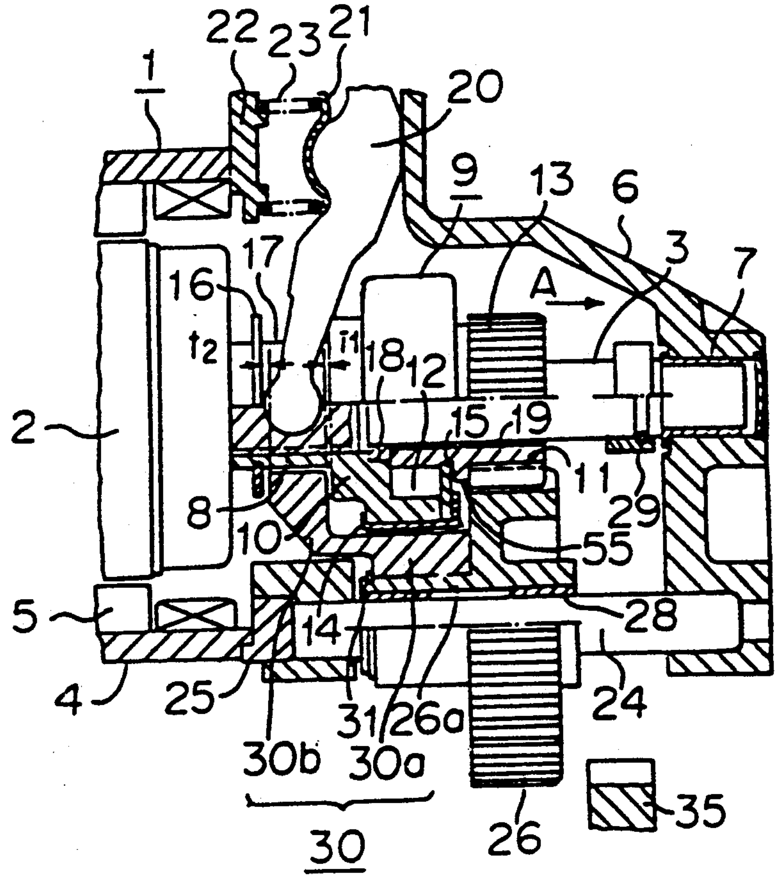
FIG. 5*a* is a longitudinal cross-sectional view partly omitted of a fourth embodiment of the starter motor according to the present invention and FIG. 5*b* is an exploded view of a portion thereof.
Figure 5B:
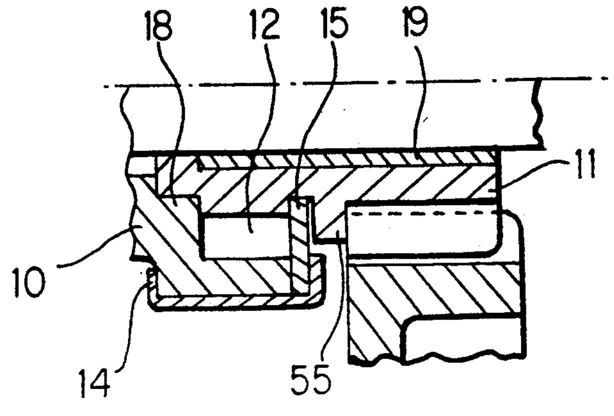

FIGS. 5*a* and 5*b* shows a fourth embodiment of the present invention.

An interposing member 55 having a flange-like-shape is formed integrally with the outer circumference of the clutch inner 11 of the overrunning clutch 9 so as to be in contact with the rear end of the intermediate gear wheel 26. The movable connecting member 30 which is the same as that of the first embodiment is provided. Namely, the boss portion 30*a* is loosely fitted onto the outer circumference of the extended boss portion 26*a* extending from the intermediate gear wheel 26, and the movable connecting member is prevented from moving in the axial direction by means of the snap ring 31. The circular-arc-shaped fitting portion 30*b* is fitted to the lower half portion of the fitting groove 17, and the gaps $t_1$ and $t_2$ are formed in the same manner as the above-mentioned embodiments.

In the above-mentioned embodiments, the overrunning clutch 9 is directly mounted on the front end portion of the rotary shaft 3. However, the present invention is applicable to such a construction that a torque of the rotary shaft having a shortened front shaft portion is transmitted to an output shaft through a planet type gear wheel speed reducing device, and an overrunning clutch is mounted on the output shaft so as to transmit the revolution of the intermediate gear wheel.

In accordance with the present invention, an interposing member is provided between the front end of the clutch cover attached to the overrunning clutch and the rear end of the intermediate gear wheel; a movable connecting member is loosely fitted to an extended boss portion extending from the intermediate gear wheel but is prevented from moving in the axial direction; a circular-arc-shaped fitting portion extending upwardly from the rear end of the movable connecting member is fitted to a fitting groove formed in the overrunning clutch so as to be movable in the axial direction in association with the overrunning clutch, and gaps are formed at the front and rear ends o the circular-arc-shaped fitting portion in the axial direction of the fitting groove. Accordingly, there is no danger of deformation or breakage of a stop ring formed at the rear of the fitting groove because the stop ring does not impinge on the movable connecting member.

Obviously, numerous modifications and variations of the present invention are possible in light of the above teachings. It is therefore to be understood that within the scope of the appended claims, the invention may be practiced otherwise than as specifically described herein.

What is claimed is:

1. A starter motor with an intermediate gear wheel, comprising:
   - a d.c. motor having a rotary shaft;
   - an overrunning clutch adapted to transmit a one-way revolution by the revolution of the rotary shaft, and adapted to be advanced in a forward direction or retracted in a rearward direction by the pivotal movement of a shift lever;
   - an intermediate shaft arranged in parallel to an axial center line of the overrunning clutch;
   - an intermediate gear wheel supported by the intermediate shaft in a rotatable and axially moveable manner, said intermediate gear wheel being interlocked with a pinion formed at a front end of the overrunning clutch, and being movable forwardly in response to said pivotal movement of said shift lever so as to be interlocked with a ring gear of an engine whereby the engine is started to rotate, said intermediate gear wheel including an extended boss portion projecting in said rearward direction from a rear end of said intermediate gear;
   - a movable connecting member including a boss portion loosely fitted onto an outer circumference of said extended boss portion, but is prevented from moving in the axial direction, and a fitting portion formed integrally with a rear end portion of the boss portion and fitted in a fitting groove formed at a rear end portion of the overrunning clutch so as to be movable in the axial direction of the clutch;
   - a stop ring provided at a rear end of the fitting groove; and
   - an interposition member interposed between a front end of a clutch cover fitted onto the overrunning clutch and the rear end of the intermediate gear wheel so that gaps are formed at the front and rear ends of the fitting portion in the fitting groove in its axial direction.

2. The starter motor with an intermediate gear wheel according to claim 1, wherein the interposition member is formed integrally with the front end of the boss of the movable connecting member so as to extend upwardly.

3. The starter motor with an intermediate gear wheel according to claim 1, wherein the interposition member has a circular-plate-like shape in which a through hole is formed; the member is in contact with a rear end of the intermediate gear wheel and is fitted onto the outer circumference of the extended boss portion.

4. The starter motor with an intermediate gear wheel according to claim 1, wherein the interposition member has a circular-flange-like shape and is formed integrally with the outer circumference of the clutch inner of the overrunning clutch, said interposition member contacting the rear end of the intermediate gear wheel.

5. The starter motor with an intermediate gear wheel according to claim 1, wherein said fitting portion has an arcuate shape.

* * * * *